United States Patent
Kim

(10) Patent No.: US 8,663,835 B2
(45) Date of Patent: Mar. 4, 2014

(54) CAP ASSEMBLY AND SECONDARY BATTERY HAVING THE SAME

(75) Inventor: Cheon-Soo Kim, Suwon-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 803 days.

(21) Appl. No.: 12/634,488

(22) Filed: Dec. 9, 2009

(65) Prior Publication Data

US 2010/0143792 A1 Jun. 10, 2010

(30) Foreign Application Priority Data

Dec. 10, 2008 (KR) .................. 10-2008-0125349

(51) Int. Cl.
*H01M 2/08* (2006.01)

(52) U.S. Cl.
USPC .......... 429/174; 429/163; 429/166; 429/170; 429/175; 429/179

(58) Field of Classification Search
USPC ................. 429/163, 166, 179, 174, 175, 170
See application file for complete search history.

(56) References Cited

U.S. PATENT DOCUMENTS

| | | | |
|---|---|---|---|
| 5,707,756 | A | 1/1998 | Inoue |
| 6,537,693 | B1 | 3/2003 | Suzuki et al. |
| 6,573,000 | B1 * | 6/2003 | Miyazaki et al. ............ 429/185 |
| 2003/0027038 | A1 | 2/2003 | Tsukamoto et al. |
| 2005/0074667 | A1 | 4/2005 | Yang |
| 2006/0078787 | A1 | 4/2006 | Sato |
| 2006/0093904 | A1 | 5/2006 | Cheon et al. |
| 2007/0059593 | A1 * | 3/2007 | Kim et al. ..................... 429/162 |
| 2009/0061310 | A1 | 3/2009 | Kim |
| 2009/0186269 | A1 | 7/2009 | Kim et al. |

FOREIGN PATENT DOCUMENTS

| | | |
|---|---|---|
| JP | 06-215746 | 8/1994 |
| JP | 06-215747 | 8/1994 |
| JP | 07-027051 | 5/1995 |
| JP | 07-254401 | 10/1995 |
| JP | 95-027051 | 8/1996 |
| JP | 08-293295 | 11/1996 |
| JP | 10 340714 | 12/1998 |
| JP | 2000-090912 | 3/2000 |
| JP | 2001-196047 | 7/2001 |
| JP | 2001-351608 | 12/2001 |
| JP | 2002-170531 | 6/2002 |
| JP | 2003-187773 | 7/2003 |

(Continued)

OTHER PUBLICATIONS

EP Search Report for related EP Application No. 09177456.2-2119, Feb. 2, 2010.

*Primary Examiner* — Patrick Ryan
*Assistant Examiner* — Alex Usyatinsky
(74) *Attorney, Agent, or Firm* — Knobbe, Martens, Olson & Bear, LLP

(57) ABSTRACT

Provided are a cap assembly for a secondary battery and a secondary battery having the same. Here, when a can is sealed using a laser beam, soot and degradation of a gasket of the cap assembly may be prevented.

The cap assembly includes an electrode terminal, a cap plate having a terminal through-hole, and a gasket disposed between the electrode terminal and the cap plate, and a distance between an outermost edge of the gasket and an outermost edge of the cap plate is 0.7 times or greater than a diameter of a laser beam used in a sealing process of the can.

6 Claims, 2 Drawing Sheets

(56) References Cited

FOREIGN PATENT DOCUMENTS

| | | |
|---|---|---|
| JP | 2003-217544 | 7/2003 |
| JP | 2004-152697 | 5/2004 |
| JP | 2005-174903 | 6/2005 |
| JP | 2006-066269 | 3/2006 |
| JP | 2006-286561 | 10/2006 |
| JP | 2007-207453 | 8/2007 |
| JP | 2008-084803 | 4/2008 |
| KR | 97-47070 | 7/1997 |
| KR | 1020010056363 | 12/1999 |
| KR | 1020010051870 | 6/2001 |
| KR | 1020010060507 | 7/2001 |
| KR | 1020010061303 | 7/2001 |
| KR | 1020010101035 | 11/2001 |
| KR | 1020030066243 | 8/2003 |
| KR | 100471966 | 2/2005 |
| KR | 1020070076172 | 1/2006 |
| KR | 102006 0022360 | 3/2006 |
| KR | 100579400 | 5/2006 |
| KR | 1020060037595 | 5/2006 |
| KR | 1020060112728 | 11/2006 |
| KR | 1020060118719 | 11/2006 |
| KR | 10-0734758 | 6/2007 |
| KR | 1020070093171 | 9/2007 |
| KR | 1020080007155 | 1/2008 |
| KR | 1020080022945 | 3/2008 |
| KR | 1020080043533 | 5/2008 |

* cited by examiner

CAP ASSEMBLY AND SECONDARY BATTERY HAVING THE SAME

CROSS-REFERENCE TO RELATED APPLICATION

This application claims the benefit of Korean Patent Application No. 10-2008-0125349, filed Dec. 10, 2008, the disclosure of which is hereby incorporated herein by reference in its entirety.

BACKGROUND OF THE INVENTION

1. Field of the Invention

The present invention relates to a cap assembly and a secondary battery having the same, and more particularly, to a cap assembly preventing soot and degradation of a gasket thereof when a can is sealed using a laser beam, and a secondary battery having the same.

2. Description of the Related Art

In recent times, compact, slim and light-weight portable electric/electronic devices including cellular phones, notebook computers and camcorders are actively developed and produced. These devices have a battery pack to be operated in any places to which a power source is not provided. Examples of the battery pack include nickel-cadmium (Ni—Cd), nickel-metal hydride (Ni-MH) and lithium (Li) batteries, in an economical aspect, which are generally rechargeable secondary batteries.

Among them, the Li secondary batteries are widely used to the portable electric-electronic devices because of a three times higher operating voltage and a higher energy density per unit weight than the Ni—Cd and Ni-MH batteries. The Li secondary batteries are classified into a lithium ion battery using a liquid electrolyte and a lithium polymer battery using a polymer electrolyte according to the kind of the electrolyte used, or cylindrical, prismatic and pouch type batteries according to the shape of the battery.

The secondary battery generally includes an electrode assembly, a can accommodating the electrode assembly and an electrolyte which allows migration of lithium ions in the electrode assembly, and a cap assembly sealing the can. Here, the electrode assembly includes a positive electrode plate having a positive electrode collector to which a positive electrode active material is applied and a positive electrode tab electrically connected to a side of the positive electrode assembly. The electrode assembly also has a negative electrode plate having a negative electrode collector to which a negative electrode active material is applied and a negative electrode tab electrically connected to a side of the negative electrode collector, and a separator disposed between the both electrode plates.

For a prismatic secondary battery, the cap assembly generally includes, but is a bit different from other types of the Li secondary battery, a cap plate having a predetermined-sized terminal through-hole, an electrolyte inlet and a safety vent and coupled to the can. The cap assembly also has a terminal plate disposed under the cap plate and electrically connected to a negative or positive electrode tab of the electrode assembly. The cap assembly also has an insulating plate disposed between the cap plate and the terminal plate, an electrode terminal electrically connected to the terminal plate through the terminal through-hole of the cap plate, and a gasket insulating the electrode terminal from the cap plate.

Conventionally, in order to enhance the connection strength between the can and the cap plate, a method of welding the cap plate of the cap assembly to the can using a laser beam is used. However, in the secondary battery used in a small-sized electronic/electric device, the distance between a welding point of the cap plate and an outermost edge of the gasket of the cap assembly is not sufficiently large. Consequently, the gasket may become sooty or degraded as a result of the laser welding, and thus the secondary battery may not be tightly sealed, resulting in reduced reliability of the secondary battery.

SUMMARY OF THE INVENTION

Aspects of the present invention provide a cap assembly for a secondary battery in which a welding point of a cap plate is spaced a predetermined distance apart from an outermost edge of a gasket to prevent smoke and degradation of the gasket, and a secondary battery having the same.

According to an embodiment of the present invention, a cap assembly includes an electrode terminal, a cap plate having a terminal through-hole, and a gasket disposed between the electrode terminal and the cap plate. Here, a distance between an outermost edge of the gasket and an outermost edge of the cap plate is 0.7 times or greater than a diameter of a laser beam used in a welding process of the can.

According to another embodiment of the present invention, a secondary battery includes: an electrode assembly including a positive electrode plate, a negative electrode plate, and a separator disposed between the both electrode plates; a can accommodating the electrode assembly; and a cap assembly including an electrode terminal, a cap plate having a terminal through-hole, and a gasket disposed between the electrode terminal and the cap plate, and sealing the can. Here, a distance between an outermost edge of the gasket and an outermost edge of the cap plate is 0.7 times or greater than a diameter of a laser beam used in a sealing process of the can.

Additional aspects and/or advantages of the invention will be set forth in part in the description which follows and, in part, will be obvious from the description, or may be learned by practice of the invention

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
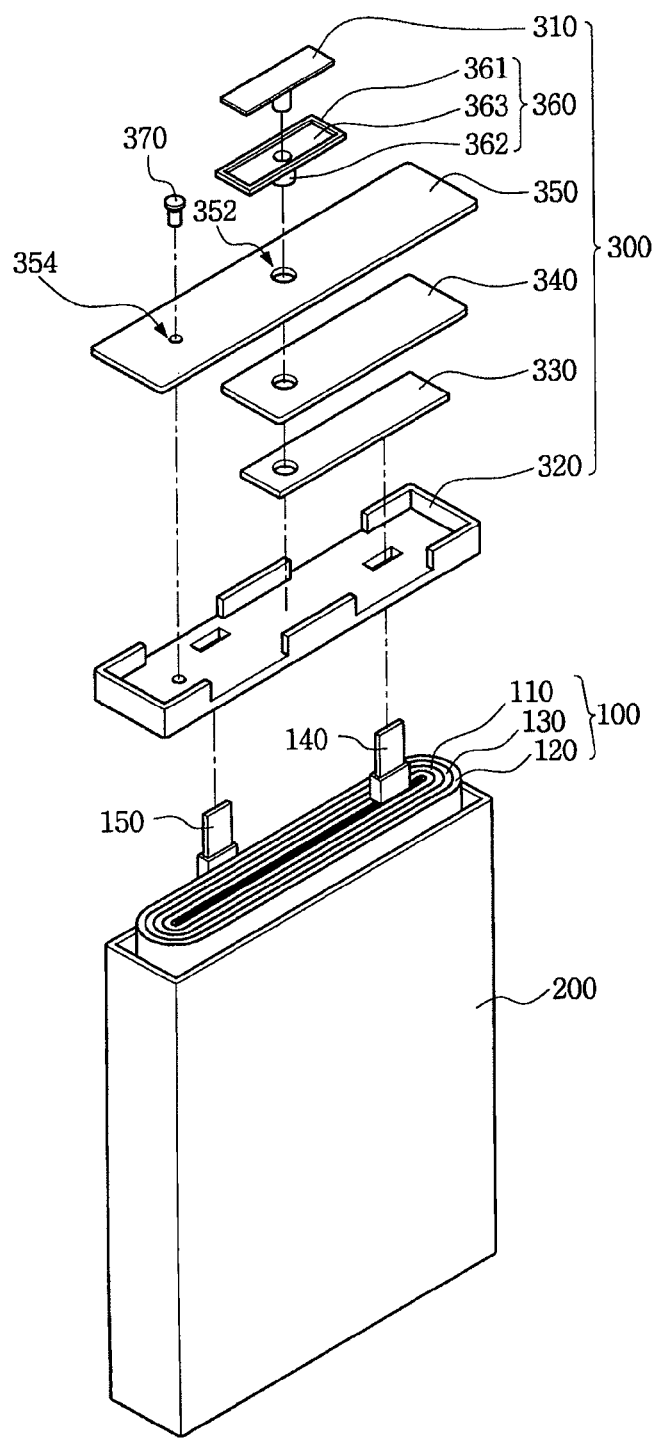
FIG. 1 is an exploded perspective view of a secondary battery according to an exemplary embodiment of the present invention.

Reference will now be made in detail to the present embodiments of the present invention, examples of which are shown in the accompanying drawings. Further, in the drawings, the length and thickness of a layer and a region may be exaggerated for convenience. In addition, like reference numerals refer to the like elements throughout the specification. When a portion is "connected" with another portion, these portions may be "directly connected" or "electrically connected" with each other with a different device therebetween.

Exemplary Embodiment

Figure 2:
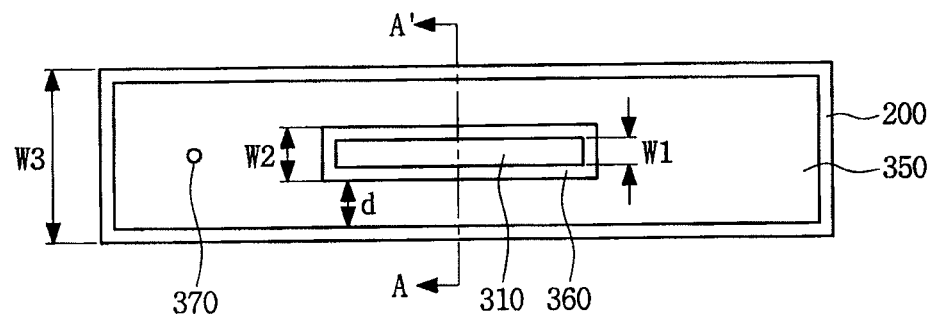
FIG. 2 is a plan view of a cap assembly according to an exemplary embodiment of the present invention.
Figure 3:
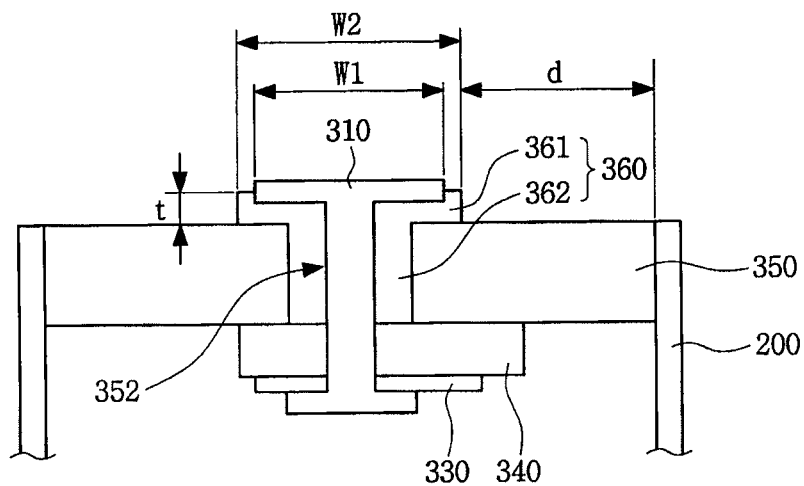
FIG. 3 is a cross-sectional view taken along line A-A' of FIG. 2.

FIG. 1 is an exploded perspective view of a secondary battery according to an exemplary embodiment of the present invention, FIG. 2 is a plan view of a cap assembly according to an exemplary embodiment of the present invention, and FIG. 3 is a cross-sectional view taken along line A-A' of FIG. 2.

Referring to FIGS. 1 to 3, the secondary battery according to an exemplary embodiment of the present invention includes an electrode assembly 100, a can 200 accommodating the electrode assembly 100 and an electrolyte (not shown), and a cap assembly 300 having an electrode terminal 310, a cap plate 350 and a gasket 360, and sealing the can 200. Here, a distance d between an outermost edge of the cap plate 350 and an outermost edge of the gasket 360 is 0.7 times or greater than a diameter of a laser beam (not shown) used in the process of sealing the can 200.

The electrode assembly 100 includes a positive electrode plate 120 having a positive electrode collector (not shown) to which a positive electrode active material (not shown) is applied and a positive electrode tab 150 electrically connected to a side of the positive electrode collector, a negative electrode plate 110 having a negative electrode collector (not shown) to which a negative electrode active material (not shown) is applied and a negative electrode tab 140 electrically connected to a side of the negative electrode collector, and a separator 130 disposed between the positive electrode plate 120 and the negative electrode plate 110. In FIG. 1, the negative electrode tab 140 is disposed in the middle of the electrode assembly 100, and the positive electrode tab 150 is disposed at an edge of the electrode assembly 100. However, the positions of the negative electrode tab 140 and the positive electrode tab 150 may be changed, and one of the negative electrode tab 140 and the positive electrode tab 150 may project in an opposite direction to the cap assembly 300.

Examples of the positive electrode active material may include lithium-containing transition metal oxides or lithium chalcogenide compounds including $LiCoO_2$, $LiNiO_2$, $LiMnO_2$, $LiMn_2O_4$ and $LiNi_{1-x-y}Co_xM_yO_2$ (wherein, $0 \leq x \leq 1$, $0 \leq x \leq 1$, $0 \leq x+y \leq 1$, M is a metal, e.g., Al, Sr, Mg or La). Examples of the negative electrode active material may include carbon materials such as crystalline carbon, amorphous carbon, a carbon complex and a carbon fiber, a lithium metal or a lithium alloy.

The positive or negative electrode collector may be formed of one selected from the group consisting of stainless steel, nickel, copper, aluminum and an alloy thereof. The positive electrode collector may be formed of aluminum or an aluminum alloy, and the negative electrode collector may be formed of copper or a copper alloy.

The separator 130 is disposed between the positive electrode plate 120 and the negative electrode plate 110 to prevent an electrical short-circuit between the both electrode plates 120 and 110, and allow migration of lithium ions. The separator 130 may be a polyolefin-based polymer layer formed of polyethylene (PE) or polypropylene (PP), or a multilayer thereof.

As shown in FIG. 1, the can 200 may be formed in a prismatic shape having a top opening at one side, and formed of a metallic material such as aluminum, an aluminum alloy or stainless steel, which is light and flexible. Here, the can 200 may be electrically connected to one of the positive and negative electrode tabs 150 and 140 to serve as a terminal having an opposite polarity to the electrode terminal 310 of the cap assembly 300.

The cap assembly 300 is coupled to an open region of the can 200, and includes a cap plate 350, an insulating plate 340, a terminal plate 330 and an electrode terminal 310. Here, the cap assembly 300 may further include an insulating case 320 formed of an insulating resin such as polypropylene (PP), polyphenylensulfide (PPS), polyethersulfone (PES) or denatured polyphenylene oxide (PPO) to fix the positive and negative electrode tabs 150 and 140 projecting from the electrode assembly 100.

The cap plate 350 is a metal plate having the size and shape corresponding to an opening of the can 200, which includes a predetermined-sized terminal through-hole 352, an electrolyte inlet 354 and a safety vent (not shown). In FIGS. 1 to 3, the cap plate 350 has a bit smaller area than the open region of the can 200, and is inserted into the open region of the can 200. However, the cap plate 350 may have the same area as the opening of the can 200, and the open region of the can 200 may have a groove (not shown) in which the cap plate 350 can be mounted.

The safety vent may be formed in any place that does not interfere with the terminal through-hole 352 and the electrolyte inlet 354, or formed at a side of the can 200.

The electrolyte inlet 354 is to inject an electrolyte facilitating migration of lithium ions into the can 200 accommodating the electrode assembly 100. After the can 200 is sealed with the cap assembly 300, the electrolyte is injected through the electrolyte inlet 354, and then the electrolyte inlet 354 is sealed with an electrolyte inlet plug 370 to completely seal the can 200.

Under the cap plate 350, a terminal plate 330 electrically connected to one of the positive and negative electrode tabs 150 and 140 of the electrode assembly 100, and an insulating plate 340 insulating the terminal plate 330 from the cap plate 350 are sequentially disposed. Here, the insulating plate 340 may have a larger area than the terminal plate 330 to prevent a short circuit between the terminal plate 330 and the cap plate 350 when the can 200 is electrically connected to one of the positive and negative electrode tabs 150 and 140 of the electrode assembly 100.

The electrode terminal 310 is electrically connected to the terminal plate 330 through the terminal through-hole 352 of the cap plate 350 to serve as a terminal of the secondary battery. The gasket 360 formed of rubber or a non-conductive material is disposed between the electrode terminal 310 and the cap plate 350 to insulate each other.

The gasket 360 includes a gasket head 361 disposed between a side surface of the cap plate 350 and the electrode terminal 310, and a gasket body 362 disposed between a side of the terminal through-hole 352 and the electrode terminal 310. Here, the gasket 360 may further include a mounting part 363 in which the electrode terminal 310 is mounted.

Table 1 shows that whether the gasket becomes sooty or degraded according to a ratio of the distance between a welding point and a gasket to the diameter of the laser beam.

TABLE 1

| | Ratio of distance to laser beam diameter | | | |
|---|---|---|---|---|
| | 0.5 | 0.6 | 0.7 | 0.8 |
| Soot/Non-soot | Soot | Soot | No Soot | No Soot |

Referring to Table 1, when the distance between the welding point and the gasket is 0.7 times or greater than the diameter of the laser beam, the gasket does not become sooty or degraded. That is, when the diameter of the laser beam is 0.7 mm, the distance between the welding point and the gasket should be 0.5 mm.

Conventionally, a welding point between the can 200 and the cap assembly 300 is disposed at an outermost edge of the cap plate 350, so that the distance d between the outermost edge of the cap plate 350 and the outermost edge of the gasket 360 should be 0.7 times or greater than the diameter of the laser beam to prevent the soot and degradation of the gasket 360 due to the laser beam in the process of sealing the can 200.

Accordingly, in the cap assembly for a secondary battery and the secondary battery according to the exemplary embodiment of the present invention, the distance d between the outermost edge of the cap plate 350 and the outermost edge of the gasket 360 of the cap assembly 300 is designed to be 0.7 times or greater than the diameter of the laser beam, and thus the soot and degradation of the gasket 360 are prevented.

Referring to FIG. 2, the distance d between the outermost edge of the cap plate 350 and the outermost edge of the gasket 360 of the cap assembly 300 may be determined by a width W3 of the cap plate 350 and a width W2 of the gasket 360. Here, since the width W2 of the gasket 360 is proportional to a width W1 of the electrode terminal 310, the width W1 of the electrode terminal 310 may be reduced to maintain the distance d between the outermost edge of the cap plate 350 and the outermost edge of the gasket 360 of the cap assembly 300 without an increase in total size of the secondary battery.

In order to enhance the connection strength and sealing performance between the electrode terminal 310 and the cap plate 350, when the spinning electrode terminal 310 is coupled to the terminal through-hole 352 of the cap plate 350 at a predetermined pressure by spinning, the gasket 360 may be spread due to the spinning of the electrode terminal 310. A spreading degree of the gasket 360 is proportional to a thickness t of the gasket head 361, and inversely proportional to a diameter of the terminal through-hole 352 into which the gasket body 362 is inserted. Accordingly, as the width W1 of the electrode terminal 310 is reduced, the thickness t of the gasket 360 may be reduced, or the spreading degree of the gasket 360 may be reduced by increasing a diameter of the cap plate 350 into which the gasket 360 is inserted.

The electrode terminal 310 is electrically connected to an external circuit (not shown) such as a protection circuit controlling charge/discharge of the electrode assembly 100. When the width W1 of the electrode terminal 310 is reduced to the predetermined level or less, the electrical connection between the electrode terminal 310 and the external circuit may be unstable. More specifically, when the width W1 of the electrode terminal 310 is less than 1.8 mm, the electrical connection with the external terminal may be unstable due to a welding process such as laser welding or resistance welding. For this reason, the width W1 of the electrode terminal 310 may be in the range from 1.8 to 2 mm, in order to maintain the distance d between the outermost edge of the cap plate 350 and the outermost edge of the gasket 360 of the cap assembly 300 without an increase in size of the secondary battery, and make the sufficient electrical connection with the external terminal.

As a result, in the cap assembly for a secondary battery and the secondary battery having the same according to the exemplary embodiment of the present invention, the distance between the outermost edge of the cap plate and the outermost edge of the gasket of the cap assembly is designed to be 0.7 times or greater than the diameter of the laser beam used in the sealing process of the can, and thus the soot and degradation of the gasket due to the laser beam during the sealing process of the can my be prevented.

In addition, when the width of the electrode terminal is reduced in order to ensure the distance between the outermost edge of the cap plate and the outermost edge of the gasket of the cap assembly, the thickness of the gasket head may be reduced, or the spreading degree of the gasket during the connection step of the electrode terminal to the cap plate may be minimized by increasing the diameter of the terminal through-hole of the cap plate.

In a cap assembly for a secondary battery and a secondary battery having the same according to the present invention, a distance between an outermost edge of a cap plate and an outermost edge of a gasket is designed to be 0.7 times or greater than a diameter of a laser beam used in a sealing process of a can by reducing a width of an electrode terminal of the cap assembly. Thus, soot and degradation of the gasket during the sealing process of the can may be prevented, and reduction of reliability of the secondary battery may be prevented.

In addition, in the cap assembly for a secondary battery and the secondary battery having the same according to the present invention, a thickness of the gasket or a diameter of a terminal through-hole of the cap plate is changed according to the width of the electrode terminal to reduce a spreading degree of the gasket in connection between the electrode terminal and the cap plate. Thus, the width of the electrode terminal is maintained at a predetermined level, and the distance between the outermost edge of the cap plate and the outermost edge of the gasket may be maintained at a predetermined level.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A secondary battery, comprising:
    an electrode assembly including a positive electrode plate, a negative electrode plate, and a separator disposed between the both electrode plates;
    a can accommodating the electrode assembly; and
    a cap assembly including an electrode terminal, a cap plate having a terminal through-hole and a planar upper surface, and a gasket disposed on the planar upper surface of the cap plate between the electrode terminal and the cap plate, and sealing the can,
    wherein a distance between an outermost edge of the gasket and an outermost edge of the cap plate is 0.7 times or greater than a diameter of a laser beam used in a sealing process of the can and the planar upper surface of the cap plate extends between the outermost edge of the gasket and the can.

2. The secondary battery according to claim 1, wherein the gasket includes a gasket body disposed between a side of the terminal through-hole and the electrode terminal, and a gasket head disposed between a side surface of the cap plate and the electrode terminal, and a thickness of the gasket head is proportional to a width of the electrode terminal.

3. The secondary battery according to claim 1, wherein a diameter of the terminal through-hole is inversely proportional to a width of the electrode terminal.

4. The secondary battery according to claim 1, wherein the gasket has a mounting part in which the electrode terminal is mounted.

5. The secondary battery according to claim 1, wherein the width of the electrode terminal is in the range from 1.8 to 2 mm.

6. The secondary battery according to claim 1, wherein the distance between the outermost edge of the gasket and the outermost edge of the cap plate is 0.5 mm or greater.

* * * * *